Nov. 17, 1959

P. F. BOWMAN 2,912,809

MACHINE FOR APPLYING END CLOSURES TO CARTONS

Filed Feb. 6, 1958

INVENTOR.
PAUL F. BOWMAN
BY
ATTORNEY

Nov. 17, 1959  P. F. BOWMAN  2,912,809
MACHINE FOR APPLYING END CLOSURES TO CARTONS
Filed Feb. 6, 1958                          10 Sheets-Sheet 5

INVENTOR.
PAUL F. BOWMAN
BY
ATTORNEY

Nov. 17, 1959

P. F. BOWMAN

2,912,809

MACHINE FOR APPLYING END CLOSURES TO CARTONS

Filed Feb. 6, 1958

INVENTOR.

BY PAUL F. BOWMAN

ATTORNEY

Nov. 17, 1959   P. F. BOWMAN   2,912,809
MACHINE FOR APPLYING END CLOSURES TO CARTONS
Filed Feb. 6, 1958   10 Sheets-Sheet 8

INVENTOR.
PAUL F. BOWMAN
BY
ATTORNEY

Nov. 17, 1959  P. F. BOWMAN  2,912,809
MACHINE FOR APPLYING END CLOSURES TO CARTONS
Filed Feb. 6, 1958  10 Sheets-Sheet 10

INVENTOR.
PAUL F. BOWMAN
BY
ATTORNEY

United States Patent Office 2,912,809
Patented Nov. 17, 1959

2,912,809

MACHINE FOR APPLYING END CLOSURES TO CARTONS

Paul F. Bowman, Ridgewood, N.J., assignor to Continental Paper Company, Ridgefield Park, N.J., a corporation of New Jersey Application February 6, 1958, Serial No. 713,732

12 Claims. (Cl. 53—137)

This invention relates to a machine for applying and affixing closures to cartons. More particularly, the invention relates to a machine for adhesively applying end closures to the open ends of generally tubular packed cartons without danger of contaminating the contents of the carton with adhesive substances.

The problem to which this invention is addressed is especially evident in the application of end patches to so-called patch-end cartons.

Various carton structures require less or greater care during the sealing thereof, depending mainly on the shape and size of the flaps at the open end or ends of the carton in question. A so-called sealed-end shell which has overlapping end flaps which completely cover the open end of the carton, can be sealed without any particular difficulty because the end flaps serve as a barrier between the contents of the carton and any adhesive that might be employed in the sealing operation. Patch-end cartons which have short non-overlapping end flaps and which are sealed by the adhesive application of an end patch to the outer face of short end flaps offer certain economic advantages over other carton forms such as the sealed-end shell, for example, but they involve greater sealing difficulty by reason of the open area defined by the free edges of the end flaps when the flaps are turned perpendicular to the side walls to receive the end patch. Patch-end cartons can be cut from cardboard stock with a minimum amount of waste; the applied end patches impart a rigidity to these cartons which is absent in other structures, and it is of substantial importance that the patch-end cartons are more readily rendered dust-proof. These and other economic advantages of the patch-end carton make it expedient to provide a machine for applying the end patches thereto which avoids the difficulty of adhesive control inherent in the sealing of this type of carton.

Great care must be exercised in the sealing of all types of packed cartons to avoid application of adhesive sealing material to the contents of the carton. The avoidance of adhesive application to the contents of the cartons, for the reasons described, becomes increasingly difficult when the cartons to be sealed have end flaps which only partially enclose the ends of the carton, as in the case of the end-patch carton, which are sealed by adhesively attaching plain cardboard panels or end patches to such carton flaps.

It is, therefore, the principal object of this invention to provide a machine for adhesively attaching end patches to the end flaps of cartons such that the adhesive zone by which the seal is effected is carefully confined to the area defined by the end flaps, and which completely avoids the application of adhesive substance to the contents of the carton.

To the end that the main objective of the invention may be realized, the machine herein is so designed as to adjust the generally outwardly extending end flaps of a carton at an obtuse angle in respect to the side walls of the carton and then bring an end patch into contact with the edges of the positioned end flaps such that an annular V-shaped recess is formed between the outer face of the end flaps and the inner face of the end patch. A recess so formed provides an annular area which can be rendered adhesive to complete the sealing operation, and one which is effectively isolated from the interior of the carton by reason of the annular contact between the free ends of the end flaps and inner face of the end patch.

It is a further and more specific object of the invention to provide a carton sealing machine adapted to the application of end closures to cartons by means of a thermoplastic adhesive carried by the inner face of the closure or by the outer faces of the end flaps.

It is a further object of the invention to provide a machine for automatically and simultaneously applying end patches to the opposite ends of packed cartons.

It is a still further object of the invention to provide a machine of the class described which is largely automatic, yet which is so simple as to preclude the need for frequent adjustments and maintenance service.

It is a further object of the invention to provide a carton sealing machine which avoids the need for constantly cleaning glue-pots and attendant parts such as required by conventional sealing machines, and which, as a consequence, makes it feasible to use a great number of such machines in a single manufacturing establishment.

It is, therefore, a concomitant object of the invention to provide a carton sealing machine which is relatively small and inexpensive to build, such that a multiplicity of such machines can be installed, with important economic savings, to perform the work of a single conventional machine of much greater capacity.

These and other objects and advantages of the invention will appear from the following specification when read in light of the drawings forming a part hereof, and in which drawings.

Figure 20:
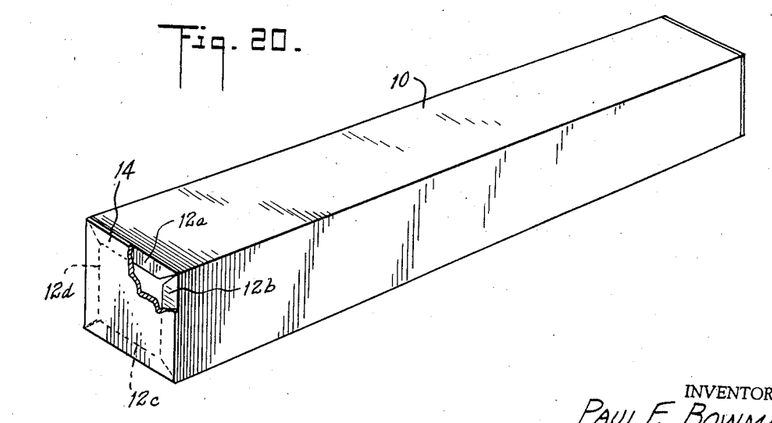
Fig. 20 is a perspective view of a carton of the type on which the machine is designed to operate, a corner of an end patch being broken away to show underlying end flaps of the carton.

As stated, the machine herein is adapted to apply end closures known as end patches to the open ends of generally tubular cartons of which that illustrated in Fig. 20 is typical. The carton of Fig. 20 has formed at opposite ends thereof four end flaps 12a, 12b, 12c and 12d, adapted to receive and adhesively retain an end patch 14. It will be noted that the flaps 12a—12d are relatively short and do not extend completely over the open end of the carton. It is the function of the machine herein to confine the adhesive effect to the area of the end flaps 12a—12d so that no adhesive comes in contact with the carton contents which may lie against or come into contact with the inner face of the end patch 14 in the area within the inner perimeter of the end flaps 12a—12d. Since the carton sealing machine herein is particularly adapted to the application of end patches having a coating of thermoplastic adhesive on the inner face thereof, provision is made for the heating of such thermoplastic coating only within the area of the end patch defined by the end flaps of the carton.

Figure 1:
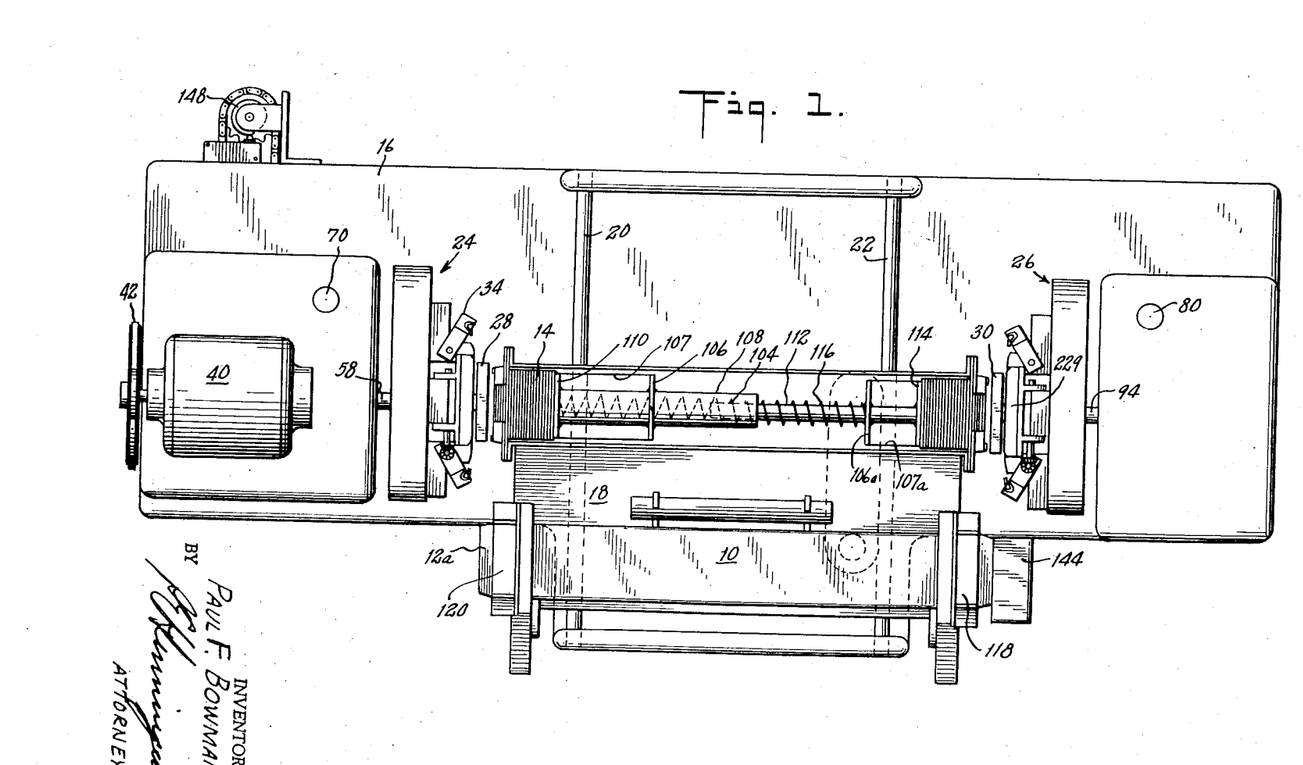
Fig. 1 is a plan view of the carton sealing machine.
Figure 16:
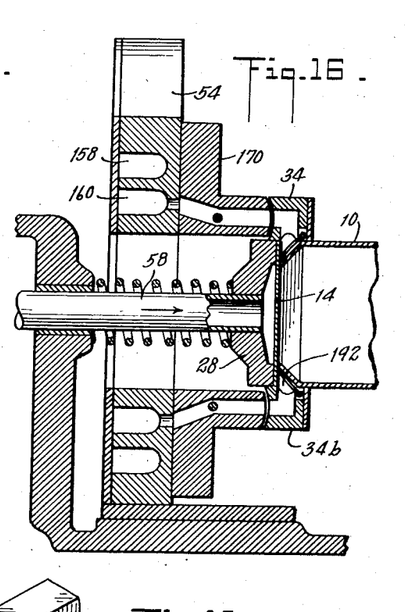
Fig. 16 is a sectional view through the sealing head of Fig. 15, showing the position of the parts at a later stage of the carton sealing operation.

By reference to Fig. 1, it will be seen that the machine under consideration is mounted on a base casing 16 and includes a carriage 18 which is mounted for reciprocation on a pair of guide rods 20 and 22 such that the carriage can be moved to present the respective ends of the carton 10 to a pair of sealing heads 24 and 26. The sealing heads are identical in structure such that an understanding of one will serve as a disclosure of both. The sealing heads include end patch holders in the form of platens 28 and 30. The platens 28 and 30 are in axial alignment and are mounted for reciprocation toward and away from each other. Each platen 28 and 30 effectively removes an end patch 14 from an end patch magazine 32 which is mounted on the back of the carriage 18. When the carriage is in its initial or loading position, as shown in Fig. 1, the open ended end patch magazine 32 is in line with the platens 28 and 30. The platens can now be reciprocated into contact with end patches at opposite ends of the patch magazine to withdraw a pair of end patches for application to a carton to be sealed. Upon slight retraction of the platens, after each has picked a patch from the patch magazine, the carriage is moved to a limit stop position at the rear of the machine. An open-ended carton 10 located at the front of the carriage 18 is in alignment with the platen 28 and 30 when the carriage is in its limit stop position. When this limit stop position of the carrage has been attained, carton flap positioning jaws 34 are rotated into contact with the end flaps 12a—12d whereby the end flaps are held at an obtuse angle which prepares them for the carriage 18 is in alignment with the platens 28 and 30 with an end patch on the face of each thereof are now moved forward to bring the end patches into contact with the positioned end flaps. As the platens are projected toward the ends of the carton, the inner face of the end patches engages the free edges of the end flaps to form an annular V-shaped recess between the inner face of the end patches and the outer face of the end flaps at each end of the carton, as best shown in Fig. 16. At this point the confronting faces of the end patches and their related end flaps can be rendered adhesive without danger of the end patch area beyond the inner edges of the flaps being likewise rendered adhesive.

Figure 13:
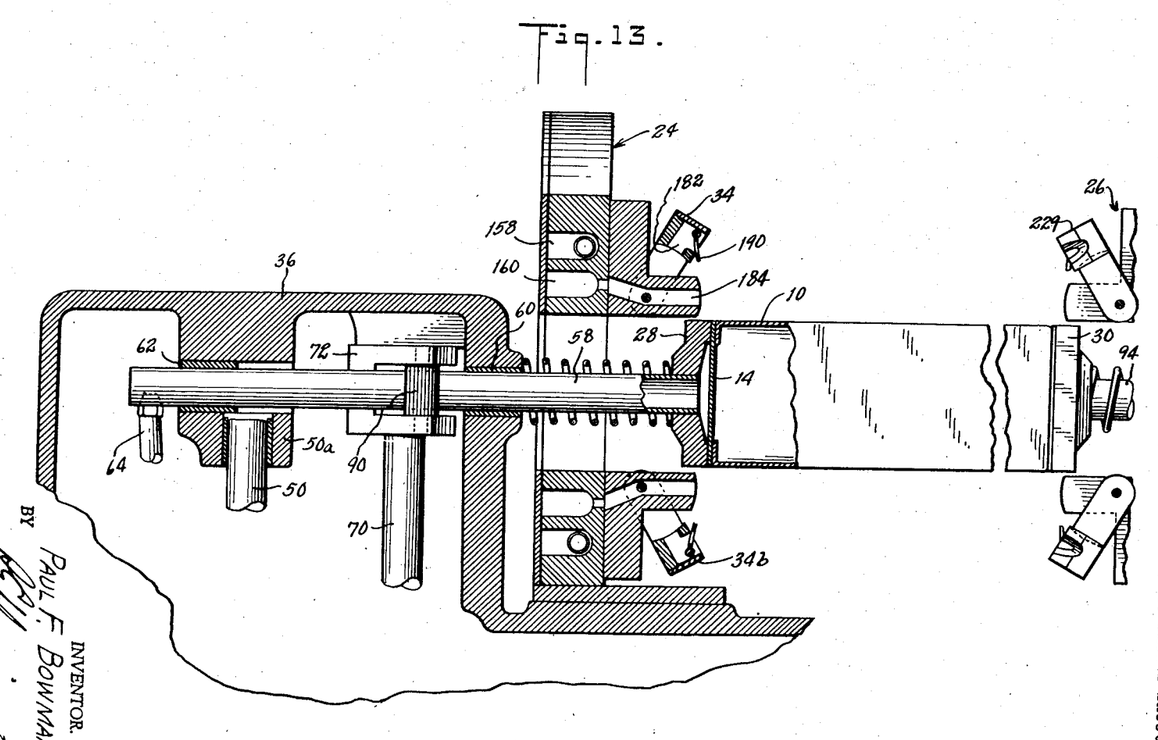
Fig. 13 is a sectional view through one of the sealing heads generally on the line 13—13 of Fig. 10.

The end patches, as stated, have their inner face coated with a thermoplastic adhesive material which can be rendered adhesive by the application of a stream of hot air to the annular recess formed between the confronting faces of the end patches and the end flaps. The machine is equally useful for sealing cartons having an adhesive coating on the outer face of the carton end flaps. When the confronting faces of the end patches and/or the end flaps have been rendered adhesive, the jaws 34 open and the platens 28 and 30 advance once again to bring the adhesive surfaces into sealing contact with each other as indicated in Fig. 13 of the drawings. After the sealing operation has been effected, the platens are withdrawn thereby freeing the sealed carton and the carriage for reciprocation to its initial or loading position. During the withdrawal of the platens, a stream of cold air is preferably applied to the ends of the sealed carton in order to set the adhesive and thereby avoid any residual danger of contact between the contents of the carton and any soft adhesive that may be exposed to such contact.

Figure 3:
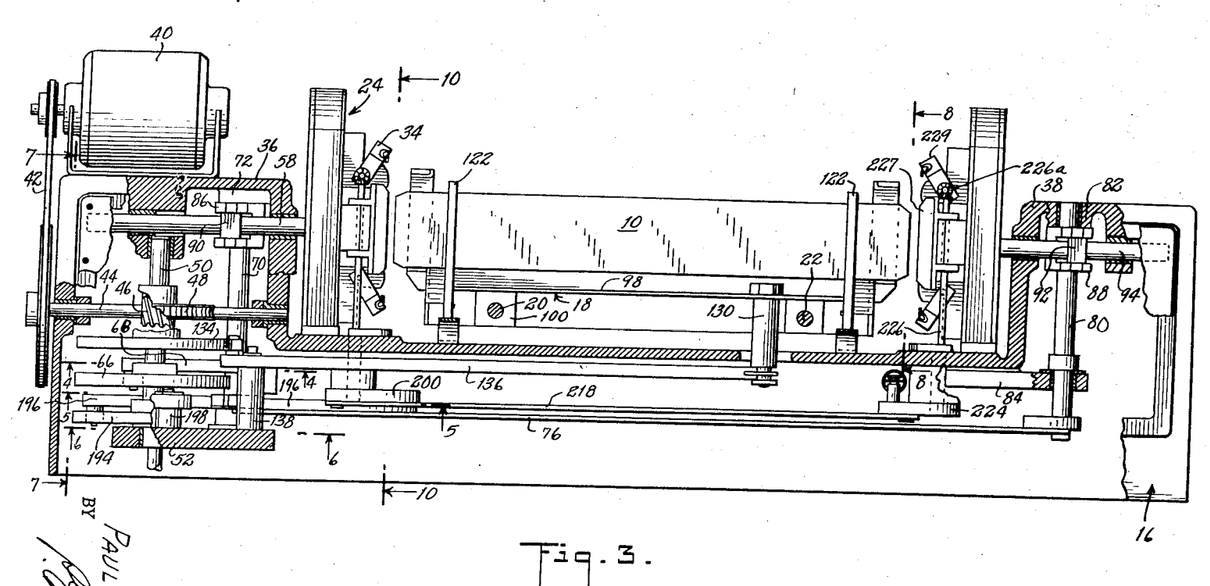
Fig. 3 is a side elevational view of the machine, parts of the base being broken away to show underlying parts.

The nature of the machine can be disclosed in greater detail by reference to Fig. 3, wherein it will be seen that the machine base 16 is formed with upstanding housings 36 and 38 at opposite ends thereof and which housings are adapted to receive the principal driving and control mechanism for the machine. The housing 36 has mounted thereon an electric motor 40 from which power is taken by way of a drive belt 42 and applied to a drive shaft 44. The drive shaft 44 has a worm 46 keyed thereto which operates in contact with a worm wheel 48. The worm wheel is secured to a cam shaft 50 which is journalled at one of its ends in a bearing 52 at the top of the housing 36, and at its other end in a bearing plate 52 at the bottom of the housing 36.

Figures 14, 15:
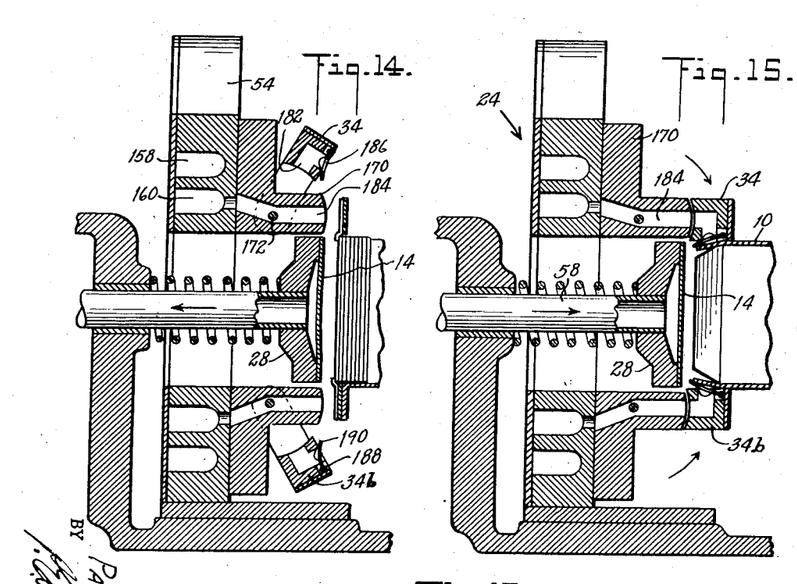
Fig. 14 is a sectional view of a sealing head showing the position of parts immediately after transfer of a carton end patch to the sealing mechanism.
Fig. 15 is a sectional view of the sealing head shown in Fig. 14, showing the position of the parts at the inception of a carton sealing operation.

A series of cams are carried and driven by the cam shaft 50. These are the cams from which the timed motion of the various components of the machine is derived. The sealing heads 24 and 26 are identical and can be described by reference to the sealing head 24 of Fig. 13. The sealing head 24 includes an annular air heating manifold 54 which has a centrally located through-passage adapted to accommodate the platen 28 which is attached to a hollow plunger rod 58. The plunger rod 58 is mounted for reciprocation in bushings 60 and 62 located respectively in the inner wall of the housing 36 and in an internal bearing boss 50a. The outer end of the plunger rod 58 has a connection by way of a flexible tube 64 with a suitable air pump (not shown), whereby air may be exhausted from the plunger rod 58 and from the space between the face of the platen with which the open end of the plunger rod communicates and an open patch 14 when the platen is in contact with an end patch as shown in Fig. 14. By the same token, a blast of cold air can be admitted to the plunger rod 58 as the platen 28 is being withdrawn from contact with the end patch 14 sealed to the end of the carton 10.

Figure 5:
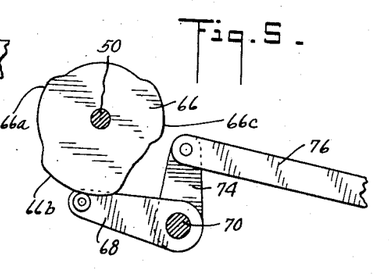
Fig. 5 is a view on line 5—5 of Fig. 3.

The plunger rod 58 and consequently the platen 28 are reciprocated into a plurality of sequential-controlled positions as required by the sealing process by means of a plunger cam 66 (Fig. 3) which is carried by the cam shaft 50. The plunger cam 66 is shaped as shown in Fig. 5 of the drawings to provide lobes 66a, 66b and 66c with intermediate dwells which control respectively the timed projection of the platen 28 and the retraction thereof during each sealing cycle.

Figure 2:
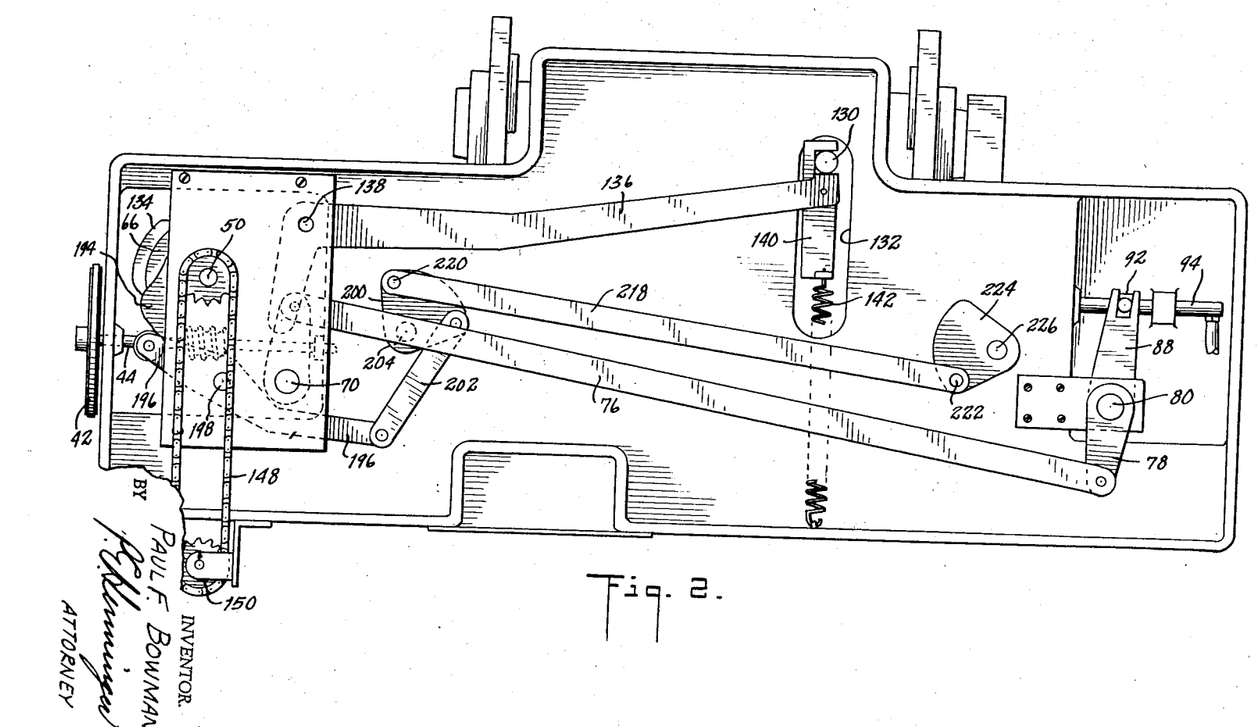
Fig. 2 is a view looking toward the bottom of the machine base from below, illustrating certain of the drive mechanism.

Motion is transmitted from the plunger cam 66 to the platen 28 by means of linkage best shown in Figs. 2 and 3. A plunger cam lever 68 is mounted on a plunger lever shaft 70 which, at its upper end, is rockably mounted in an internal bearing boss 72, and, at its lower end, in the bearing plate 52. Also, carried by the plunger lever shaft 70 is a link 74 (Fig. 5) which is connected to a plunger drive link 76 which extends under the bed of the machine to the opposite housing 38 where it is attached to a finger 78 which, in turn, is fixed to a second plunger lever shaft 80 mounted at its upper end for rocking motion in a bearing boss 82 which projects into the housing 38 and at its lower end in a bearing plate 84. It can be seen from the foregoing that as the plunger cam 66 is rotated, the same rocking motion is imparted to the plunger lever shafts 70 and 80.

The upper ends of the plunger lever shafts 70 and 80 carry forwardly projected bifurcated fingers 86 and 88, respectively. These fingers engage with outwardly projecting studs on collars 90 and 92, respectively, the collars 90 and 92 being fixed respectively to the plunger rod 58 at one side of the machine and to an identical plunger rod 94 at the other side of the machine. It can be seen, therefore, that a cam driven system has been provided for imparting controlled reciprocating motion to the plunger rods 58 and 94, such that the platens carried thereby can be reciprocated toward each other and away from each other as the several steps of a carton closing operation may require.

Figure 8:
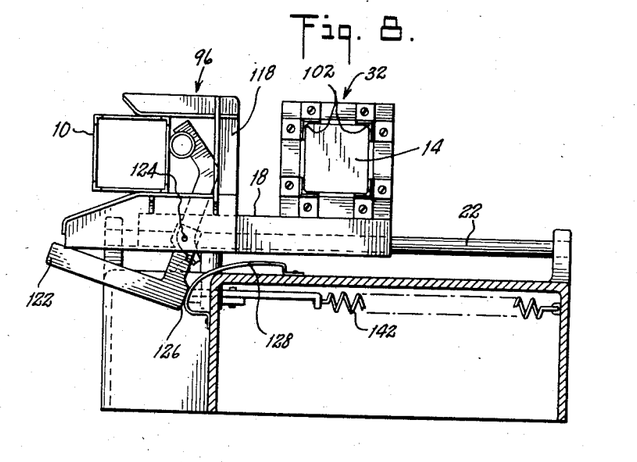
Fig. 8 is a view on line 8—8 of Fig. 3.
Figure 9:
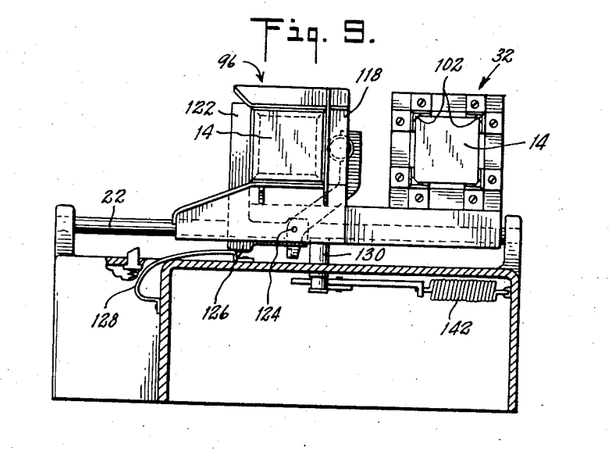
Fig. 9 is a view similar to that of Fig. 8, showing however, a carriage mechanism in a shifting position.

The carriage 18 as shown in Figs. 8 and 9 has mounted thereon the end patch magazine 32 and also a carton chuck 96. The carriage as best shown in Fig. 3 is composed of a base plate 98 supported by a plurality of guide blocks 100 which embrace the guide rods 20 and 22. The end patch magazine 32 is a three-sided container, open at both ends and at the top, adapted to receive therein a supply of end patches 14 from which the respective platens 28 and 30 can take end patches for application to the opposite ends of a carton. The opposite ends of the end patch magazine, as best shown in Figs. 8 and 9, are open such that when loaded with a supply of end patches, an end patch is always exposed through each open end of the magazine and is thereby accessible to the suction heads. The patches are retained in the magazine by corner tabs 102 embracing the four corners of the outermost patch. The end patches are sufficiently flexible to permit their withdrawal from the magazine by the suction heads, or platens as mentioned above. Located within the patch magazine 32 and adapted to contact the inner patches at both ends of the magazine is a plunger structure 104 which maintains the end patches at opposite ends of the magazine under sufficient pressure to keep an end patch at each of the open ends of the magazine and in contact with the corner tabs 102 so long as a supply of patches remains in the magazine. The plunger structure 104 is in the nature of a spring-pressed cylinder and piston supported in transverse walls 106 and 106a of a pair of sliding frames 107 and 107a within the magazine 32. A tube 108 having a patch contacting head 110 extends through the wall 106 and receives the free end of a rod 112 such that the tube and the rod have a telescopic action to accommodate the quantity of patches within the magazine. The rod 112 extends through the wall 106a and has a patch contacting head 114. The rod and tube are biased into the elongated position by means of a spring 116 which is disposed within the tube 108 and about the rod 112, and abutting, at its opposite ends, the patch-contacting heads 110 and 114.

The carton chuck 98 is disposed near the front edge of the carriage 18 and comprises laterally spaced yokes 118 and 120. These yokes each comprises a forwardly opening framework adapted to snugly embrace a carton when it is properly erected therein. Each yoke has associated therewith a lever such as the lever 122 shown in Fig. 8. The lever 122, as shown, is generally L-shaped and has the foot of the L pivotally attached to the frame of the carriage at a point below the yoke by means of a pivot 124. The levers have a cam surface 126 adapted to operate in contact with an arched cam spring 128. The shape of the cam spring 128 is such that the levers are biased upwardly as the carriage 18 is moved from the position shown in Fig. 8 to that shown in Fig. 9. The levers 122, therefore, serve to engage one face of the carton and thus assure that the opposite ends of the carton are properly shaped to receive the end patches.

As shown in Fig. 3, the carriage 18 has extending downwardly therefrom a carriage post 130 which extends through a slot 132 (Fig. 2) formed in the bed plate of the machine. The carriage post 130 is the element through which power is applied to the carriage 18 for reciprocating the same into and out of its respective operative positions.

Reference to Fig. 3 will show a carriage cam 134 carried on the cam shaft 50. As better shown in Fig. 4, the carriage cam 134 is shaped to reciprocate the carriage 18 from an initial position of Fig. 8 wherein the patch magazine 32 is in alignment with the platens to a limit stop position of Fig. 9, wherein the carton chuck occupies a position in alignment with the platens. Since a substantial part of the closure cycle is performed with the carriage in the limit stop position, the cam is so shaped as to hold this latter position throughout the necessary sealing operation before it is again withdrawn to the initial position.

Figure 4:
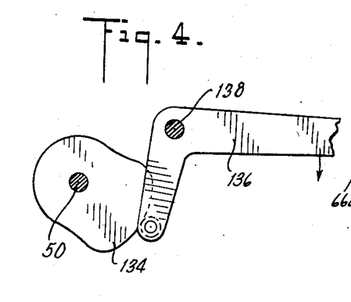
Fig. 4 is a view on line 4—4 of Fig. 3.

The carriage cam is adapted to operate on a carriage drive lever 136 which is mounted for rocking motion on a carriage drive lever post 138 (Figs. 3 and 4). As best shown in Fig. 2, the carriage drive lever 136 extends laterally where it is pivoted to a clip 140 which embraces the carriage post 130. Action of the carriage is stabilized by means of a spring 142 connected between an end of the clip 140 and the rear wall of the machine casting. It can now be seen that as the carriage cam 134 rotates, it will rock the carriage drive lever 136 about its bearing on the carriage drive lever post 138, so that its appointed end at which it is attached to the clip 140 will oscillate and thereby reciprocate the carriage between the two positions shown respectively in Figs. 8 and 9.

A pressure-operated starting switch 144 (Fig. 1) is located at one end of the carriage 18 and is so positioned that a carton end in contact therewith will close the switch and initiate a carton sealing cycle. As briefly outlined above, the first phase of an operative cycle involves the reciprocation of the platens 28 and 30 into contact with end patches in the magazine 32, the application of suction to the platens, and the partial retraction of the platens to permit movement of the carriage into its limit stop position. Movement of the platens 28 and 30 is controlled by the plunger cam 66, as described. Application of suction to the platens 28 and 30 is controlled and regulated through a conventional pneumatic system (not shown) which is connected to the plunger rods 58 and 94 by means of flexible connections such as the connection 64 shown attached to the plunger rod 58.

Figures 6, 7:
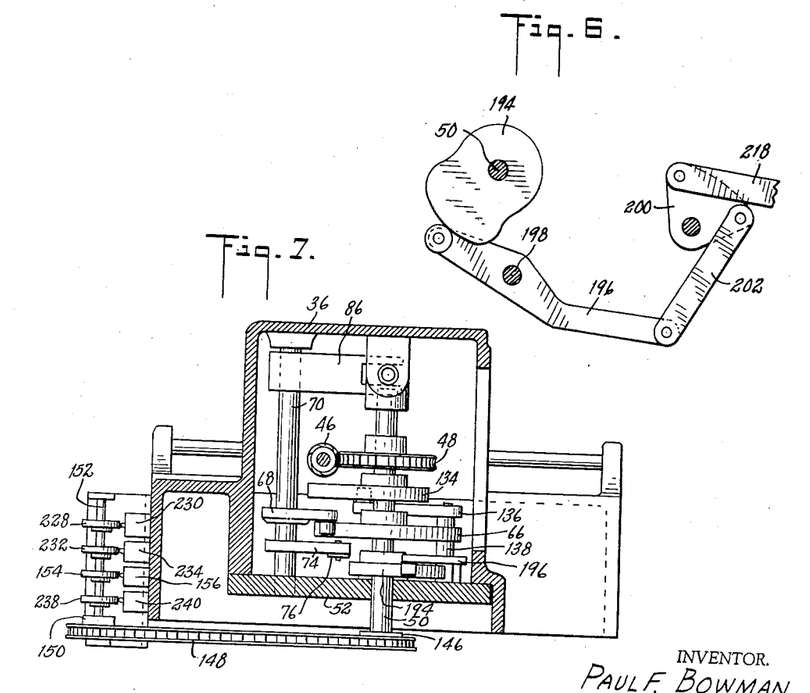
Fig. 6 is a view on line 6—6 of Fig. 3.
Fig. 7 is a view on line 7—7 of Fig. 3.

Control of suction and air to the sealing heads is through the sequential energization of conventional solenoid-operated valves in the pneumatic system. These valves are under control of a series of cams which operate in conjunction with microswitches in the control system. As shown in Fig. 7, the cam shaft 50 extends downwardly through the bearing plate 52 where it has attached thereto a sprocket 146 which engages a sprocket chain 148 adapted to drive a sprocket 150 at one end of a timing cam shaft 152. The timing cam shaft has fixed thereto a vacuum control cam 154 which controls a vacuum control microswitch 156. When the vacuum control microswitch 156 is closed by a lobe on the cam 154, a solenoid-operated valve in the pneumatic system is conditioned to connect the platens 28 and 30 with an exhaust pump such that a vacuum is created between the face of the platens and an overlying end patch. The platens 28 and 30 are now partially withdrawn, as stated, and the carriage is moved to its limit stop position under control of the carriage cam 134, in the manner described. When the carriage is in its limit stop position, the end flaps of the carton are positioned in the path of the end flap positioning jaws 34 associated with each sealing head.

Figure 10:
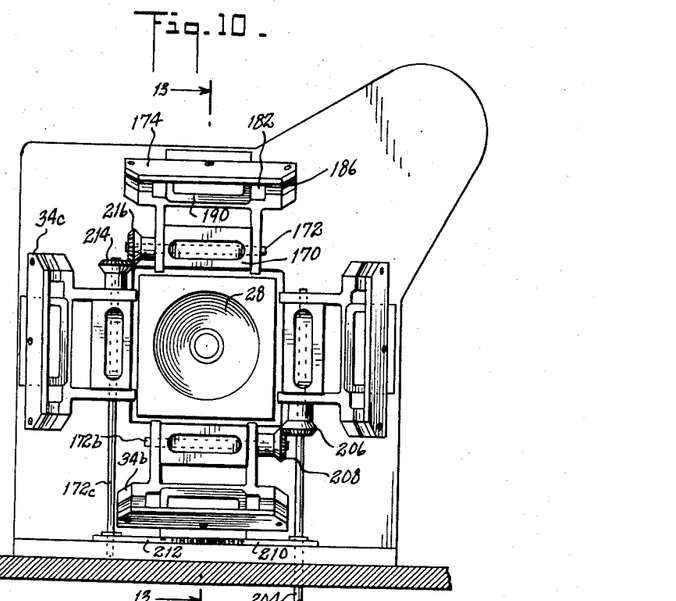
Fig. 10 is a view of a carton end sealing head forming a part of the machine herein, showing certain of the elements in open position.
Figures 17, 18:
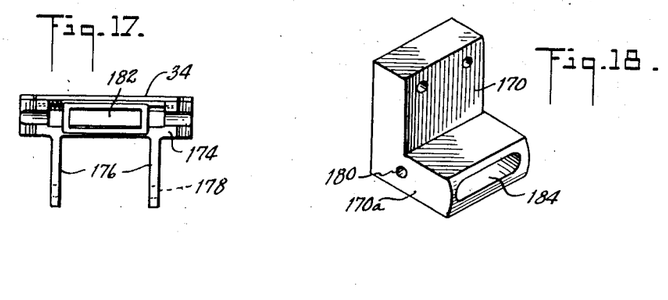
Fig. 17 is a detail view of one of the carton sealing jaws.
Fig. 18 is a detailed view of an air nozzle employed in connection with the carton sealing head.
Figure 19:
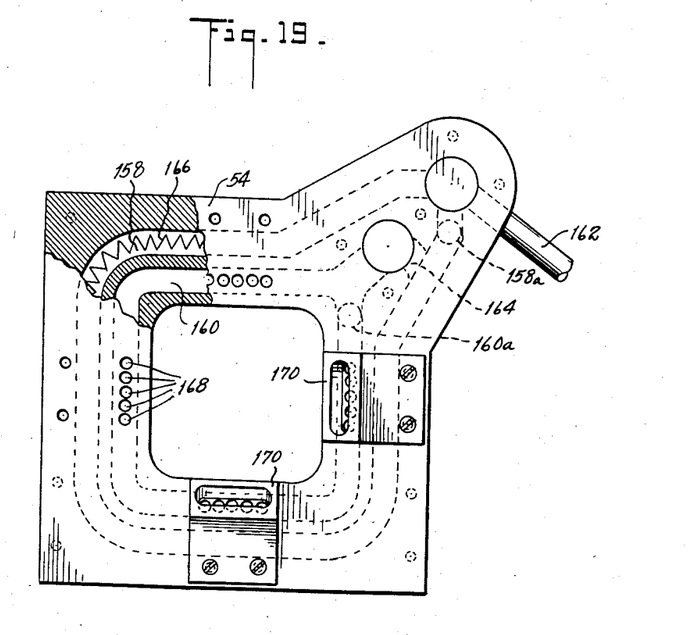
Fig. 19 is a face view, partly in section, of an air manifold employed herein.

Fig. 19 discloses one of the air manifolds 54 with which a set of end flaps positioning jaws 34 are associated, it being understood that each sealing head contains a manifold and four associated jaws. The manifolds 54 are so formed as to provide a pair of generally concentric internal conduits or channels 158 and 160. The channel 158 is directlly connected to an air conduit 162 constituting part of the pneumatic system. The two channels 158 and 160 are interconnected by a connecting passage 164. The channel 158 has disposed therein a heating coil 166 by which air entering the manifold by way of the conduit 162 is heated. A pair of plugs 158a and 160a block one leg of the channels 158 and 160, respectively, and thereby cause the air to flow through the channels in a linear course. The controlled flow of air through the channels results in an even distribution of heat throughout the manifold structure, in a more efficient heating of the air, and in the avoidance of sudden differences in temperature gradients along the flow path. Heated air flows into the inner channel 160 of the manifold where it is discharged through four sets of discharge passages 168. The discharge passages communicate with nozzles 170 which are attached to the face of the manifold 54. Each of the nozzles 170 constitutes a base about which the end flap positioning jaws 34 are rocked into and out of a closed position, as best shown by a comparison of Figs. 14 and 15. In Fig. 10, the jaws 34 are shown rocked into an open position by an operating shaft 172 by which they are mounted on the nozzles 170. Reference to Fig. 17 will show the more specific structure of each of the jaws 34. In this figure, it is seen that the jaws have a head portion 174 and a pair of parallel legs 176 which are adapted to straddle one of the nozzles 170 such that the legs 176 will lie in substantial contact with the opposite lateral side faces 170a of the related nozzle, adapting the jaw to articulation when the operating shaft 172 is rotated. The operating shaft 172 is inserted through openings 178 in the legs 176 of the jaw and through passages 180 formed in the oppositely disposed lateral faces 170a of the nozzles 170. The jaws are attached to their mounting shafts so that they will move with the shaft when it is rotated from one position to another.

Figure 11:
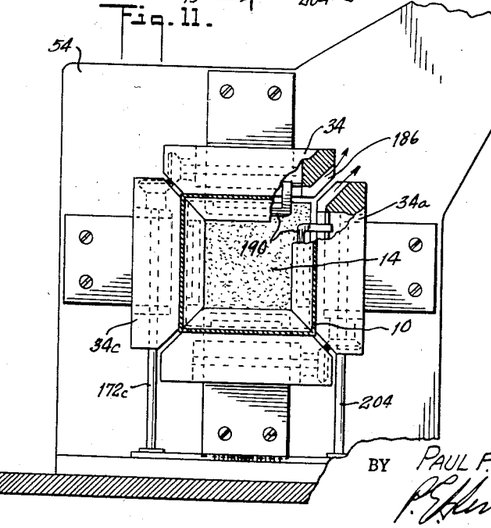
Fig. 11 is a view similar to Fig. 10, showing, however, elements of the sealing head closed into carton sealing position.

The head 174 of each jaw has a slotted inner face 182 which is adapted to register with the mouth 184 of the nozzle when the jaws are rotated into the closed position shown in Fig. 15. When the jaws 34 are in the closed position, as best shown in Fig. 11, they form a socket conforming to the cross-sectional shape and dimensions of the carton on which they are intended to operate such that a carton being operated on is embraced substantially as shown in Figs. 11 and 15. Since the jaws in effect constitute a continuation of the nozzles 170, their inwardly turned faces have formed therein slots 186 for the discharge of heated air into the annular recess between the carton flaps and the confronting face of the end patch during the sealing operation. The slots 186 are continued along the angular ends of the jaws 34 where the slot of one jaw complements the slot of an adjacent jaw to form a spent air exhaust passage.

Mounted on pivot pins 188 within the slots 186 are flap-engaging fingers 190. The mounting of the flap-engaging fingers 190 on the pins 188 is such that the flap-engaging fingers 190 are free to rock. Thus, as the jaws 34 are brought into the closed position of Figs. 11 and 15, the flap-engaging fingers 190 will engage and position the carton flaps 12a—12d at a regulated obtuse angle in respect to the side walls of the carton. This initial positioning, as shown in Fig. 15, so disposes the flaps of the carton that they are substantially simultaneously engaged by the end patch as the plunger rods 58 and 94 are driven inwardly toward their respective carton ends. Continued movement of the plunger rods results in an engagement between the end patches and the positioned carton flaps and flap-engaging fingers 190 until finally the position of Fig. 16 is achieved. An examination of Fig. 16 will reveal that an annular recess 192 has been formed by the conjunction of the end flaps 12a—12d and the end patch 14. At this point, the carton and its end patch are in position for the next step of the sealing operation, which is either the application of an adhesive to the exposed surfaces within the annular recess 192 or the application of heat for the softening of a thermoplastic adhesive carried on the face of the end patch 14, as is the case herein, or on the outer face of the end flaps.

It remains to be seen how the jaws 34 are operated from their open position, as shown in Fig. 14, to their closed position, as shown in Fig. 15, and then again to their open position.

Figure 12:
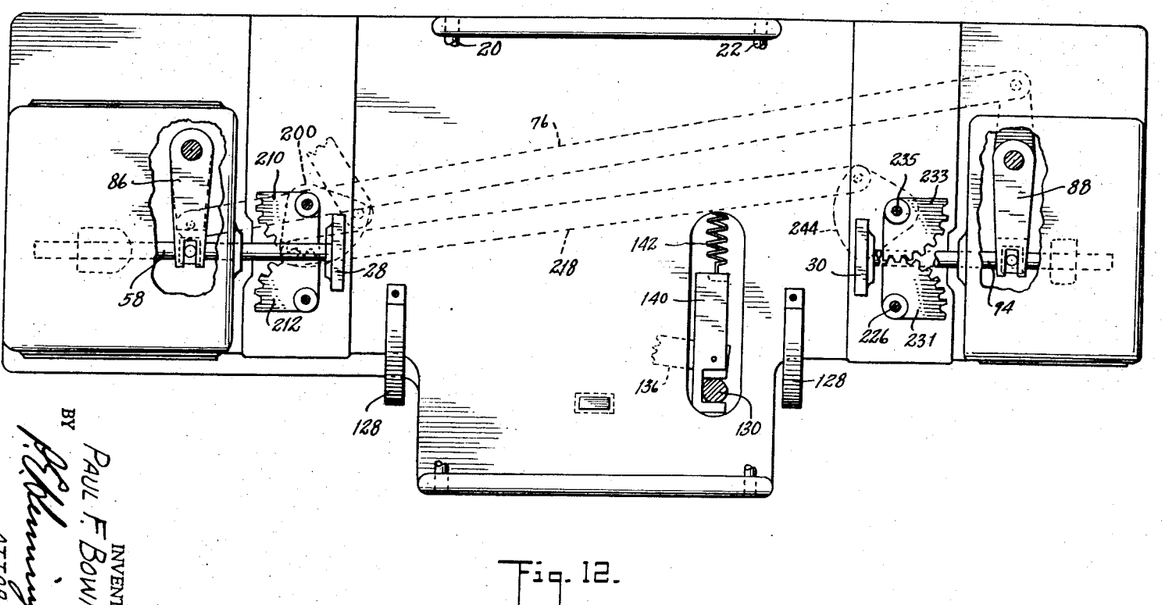
Fig. 12 is a plan view of the machine with overlying elements, including a carriage mechanism, removed to show underlying parts.

The cam shaft 50 of Fig. 3 carries a jaw cam 194 which is more specifically shown in Fig. 6. The shape of the cam 194 results in the closure of the jaws 34 and the holding of the jaws in the closed position for a sufficient length of time to permit applied hot air to soften the thermoplasic adhesive coating within the annular recess 192 of the prepositioned carton and end patches. Motion is transmitted from the cam 194, through a cam following lever 196 which is mounted for rocking movement on a jaw lever stud 198 (Fig. 3). The cam following lever 196 is connected to a segment 200 (Fig. 2) by means of a bell crank lever 202. The segment 200 is attached to the lower end of a segment shaft 204 (Fig. 10) which extends upwardly at the face of the manifold 54. The segment shaft 204 extends through one of the air nozzles and has attached thereto a jaw 34a such that when the shaft is rocked from one position to another, the jaw 34a will follow. A miter gear 206 is pinned to the segment shaft 204 and operates a miter gear 208 which is pinned to a perpendicular shaft 172b to which the jaw 34b is attached. Motion from the segment shaft 204 is transmitted to a parallel shaft 172c by means of a pair of gear segments 210 and 212 (Fig. 12). The gear segment 210 is fixed to the segment shaft 204 and partakes of its rocking motion thereby transmitting motion to the gear segment 212 which is attached to the parallel shaft 172c. The shaft 172c in turn carries with it the jaw 34c (Fig. 10). Motion is transmitted to the jaw 34 by way of a miter gear 214 at the upper end of the shaft 172c which meshes with a companion gear 216 fixed to the end of the shaft 172 through which the jaw 34 is rocked.

It can be seen, therefore, that when the segment 200 (Fig. 2) is rocked from one position to another, motion is transmitted to the jaws associated with the sealing head 24. The same motion is also transmitted to a set of four identically constituted jaws associated with the sealing head 26 by means of a jaw drive link 218 (Fig. 2) which is pivoted on a stud 220 extending from the face of the segment 200, the other end of the jaw drive link 218 being pivoted to a stud 222 extending from the face of a segment 224 which is keyed to a segment shaft 226 corresponding in every respect to the segment shaft 204, previously described.

In Fig. 3 the segment shaft 226 can be seen extending upwardly where it carries and operates a jaw 227 and where it also transmits motion to an operating shaft 226a for a jaw 229. The other jaws associated with the sealing head at the right end of the machine are driven through a pair of segments 231 and 233 (Fig. 12), as in the case of those previously described. The segment 231 is keyed to the segment shaft 226 while the segment 233 drives a segment shaft 235 from which motion is transmitted to the oppositely disposed jaws. With the foregoing in mind, it can be appreciated that the jaw sets associated with each sealing head are operated in the same direction, to the same degree and in timed relation to each other.

When the flap containing fingers 190 position the flaps of a carton, as shown in Fig. 15, and when the platens are moved toward each other to press end patches against the positioned end flaps, as shown in Fig. 16, the hot air cam 228 (Fig. 7) will be rotated into the position where it effectively operates a microswitch 230 which controls the flow of air through the manifolds, thereby admitting a stream of hot air to the annular recess 192 which is formed between the outer faces of the end flaps and the inner face of the end patch. The position of the parts is maintained as shown in Fig. 16 and the flow of hot air is continued sufficiently long to render the thermoplastic adhesive coating on the face of the end patch adhesive. The temperature of the applied hot air and the length of time the air is applied to the adhesive coating will depend to a large extent on the composition of the adhesive. For an adhesive that becomes tacky at 300° F., a blast of air maintained at somewhat under 400° F. and applied against the surface coating for a period of about one second, produces good results. The main consideration is the application of the maximum degree of heat permissible in such a short period of time that the heat does not deeply penetrate the end patch and the end flaps.

After the adhesive coating has been softened by the hot air stream, the jaws will open and the platens will advance to their ultimate position which is illustrated in Fig. 13. This further advance of the platens effectively presses the end patches into sealing engagement with the end flaps. Ordinarily, application of pressure for a period of two seconds is sufficient.

As the plunger cam 66 rotates to its low point, the platens are withdrawn, the circulation of air through the manifolds is cut off, and the vacuum control cam 154 will operate the microswitch 156 to isolate the platens from the vacuum pump. Concurrently, a cold air control cam 232 (Fig. 7) will actuate a cold air control microswitch 234. The microswitch is in the circuit of a conventional solenoid control valve which connects the platen plungers 58 and 94 with a cold air line such that a blast of cold air is directed through the plungers and platens against the outer face of the end patches. This results in the rapid setting of the adhesive and insures the certain sealing of the cartons.

The carriage cam 134 operating through the carriage drive lever 136 now becomes operative to retract the carriage to its initial or loading position. As the carriage 18 approaches its initial or loading position, an ejector 236 which is pivoted on the carriage base at a point behind the carton chucks is swung forwardly by engagement between a downwardly extending part thereof and an abutment on the face of the bed casting similar to the arched cam springs 128. The ejector 236 engages the carton 10 and partially ejects the carton from the chuck mechanism. In the meanwhile, the levers 122 have been swung outwardly by reason of the receding contour of the cam springs 128 which control the position of the fingers 122.

As the carriage reaches its initial or loading position, a motor relay control cam 238 will operate a motor relay control microswitch 240 (Fig. 7) such that the power circuit to the motor 40 is broken and operation of the machine is discontinued. The time consumed in sealing a carton, including the time required to pick the end patches, is somewhat less than six seconds.

While the fundamentally novel features of the invention have been illustrated and described in connection with a specific embodiment of the invention, it is believed that this embodiment will enable others skilled in the art to apply the principles of the invention in forms departing from the exemplary embodiment herein, and such departures are contemplated by the claims.

I claim:

1. In a machine for applying end patches to the ends of tubular open end cartons, an end patch applying station, a pair of end patch holders in said station for supporting in spaced confronting relationship a pair of carton end patches having a thermoplastic adhesive on the confronting faces thereof, a carriage adapted to support an open ended carton having outwardly projecting flaps at opposite opened ends thereof, means for moving said carriage to a limit position within said station to dispose the open ends of a carton thereon in alignment with said end patch holders, end flap positioning fingers associated with each of said end patch holders in said station for engaging and turning inwardly the end flaps of a carton, means operative when said carriage has been moved to said limit position for operating said fingers and for initially advancing said end patch holders toward each other whereby end patches supported thereby are brought into contact with the free edges of the end flaps of a carton on said carriage and an annular recess is thereby formed between the end flaps of a carton on said carriage and the end patches supported by said end patch holders, a hot air jet associated with each of said end patch holders and so located within said station as to discharge hot air into the annular recess formed between the end flaps and the end patches of a carton to be sealed, means effective after the initial advance of said end patch holders for admitting hot air to said jets whereby the end patch adhesive surface defined by said annular recess is heated, means thereafter effective to withdraw said flap-engaging fingers and further advance said patch holders into flush contact with the ends of a carton to effect a carton sealing operation, means for retracting said end patch holders, and means finally effective to move said carriage from said end patch applying station.

2. In a machine for applying end patches to the ends of tubular open end cartons, an end patch applying station, a pair of end patch holders in said station for supporting in spaced confronting relationship a pair of carton end patches having a thermoplastic adhesive on the confronting faces thereof, a carriage adapted to support an open ended carton having outwardly projecting flaps at opposite opened ends thereof, an open ended end patch magazine on said carriage, means for moving said carriage to an initial position within said station wherein said end patch holders are in alignment with the open ends of said end patch magazine, means for transferring an end patch from said magazine to each of said end patch holders, means for moving said carriage to a limit position within said station to dispose the open ends of a carton thereon in alignment with said end patch holders, end flap positioning fingers associated with each of said end patch holders in said station for engaging and turning inwardly the end flaps of a carton, means operative when said carriage has been moved to said limit position for operating said fingers and for initially advancing said end patch holders toward each other whereby end patches supported thereby are brought into contact with the free edges of the end flaps of a carton on said carriage and an annular recess is thereby formed between the end flaps of a carton on said carriage and the end patches supported by said end patch holders, a hot air jet associated with each of said end patch holders and so located within said station as to discharge hot air into the annular recess formed between the end flaps and the end patches of a carton to be sealed, means effective after the initial advance of said end patch holders for admitting hot air to said jets whereby the end patch adhesive surface defined by said annular recess is heated, means thereafter effective to withdraw said flap-engaging fingers and further advance said patch holders into flush contact with the ends of a carton to effect a carton sealing operation, means for retracting said end patch holders, and means finally effective to move said carriage from said end patch applying station.

3. In a machine for applying end patches to the ends of tubular open end cartons, an end patch applying station, a pair of axially aligned end patch holders mounted in said station for reciprocating motion toward and away from each other adapted to support in spaced confronting relationship a pair of carton end patches having a thermoplastic adhesive on the confronting faces thereof, a platform comprising a carriage adapted to support an open ended carton having outwardly projecting flaps at opposite opened ends thereof, means for mounting said carriage for reciprocation into and out of said station, means for moving said carriage to a limit position within said station to dispose the open ends of a carton thereon in alignment with said end patch holders, end flap positioning fingers associated with each of said end patch holders in said station for engaging and turning inwardly the end flaps of a carton, means operative when said carriage has been moved to said limit position for operating said fingers and for initially advancing said end patch holders toward each other whereby end patches supported thereby are brought into contact with the free edges of the end flaps of a carton on said carriage and an annular recess is thereby formed between the end flaps of a carton on said carriage and the end patches supported by said end patch holders, an annular hot air jet associated with each of said end patch holders and so located within said station as to discharge hot air into the annular recess formed between the end flaps and the end patches of a carton to be sealed, means effective after the initial advance of said end patch holders for admitting hot air to said jets whereby the end patch adhesive surface defined by said annular recess is heated, means thereafter effective to withdraw said flap-engaging fingers and further advance said patch holders into flush contact with the ends of a carton to effect a carton sealing operation, means for retracting said end patch holders, and means finally effective to move said carriage from said end patch applying station.

4. In a machine for applying end patches to the ends of tubular open end cartons, an end patch applying station, a pair of end patch holders in said station for supporting in spaced confronting relationship a pair of carton end patches having a thermoplastic adhesive on the confronting faces thereof, a carriage adapted to support an open ended carton having outwardly projecting flaps at opposite opened ends thereof, means for moving said carriage to a limit position within said station to dispose the open ends of a carton thereon in alignment with said end patch holders, end flap positioning fingers associated with each of said end patch holders in said station for engaging and turning inwardly the end flaps of a carton, means operative when said carriage has been moved to said limit position for operating said fingers and for initially advancing said end patch holders toward each other whereby end patches supported thereby are brought into contact with the free edges of the end flaps of a carton on said carriage and an annular recess is thereby formed between the end flaps of a carton on said carriage and the end patches supported by said end patch holders, a hot air jet associated with each of said end patch holders and so located within said station as to discharge hot air into the annular recess formed between the end flaps and the end patches of a carton to be sealed, means effective after the initial advance of said end patch holders for admitting hot air to said jets whereby the end patch adhesive surface defined by said annular recess is heated, means thereafter effective to withdraw said flap-engaging fingers and further advance said patch holders into flush contact with the ends of a carton to effect a carton sealing operation, means for retracting said end patch holders, means operative during the operation of said retracting means for directing a stream of cold air against the outer faces of end patches applied to the ends of a carton in said station, and means finally effective to move said carriage from said end patch applying station.

5. In a machine for applying end patches to the ends of tubular open end cartons, an end patch applying station, a pair of axially aligned end patch holders mounted in said station for reciprocation toward and away from each other adapted to support in spaced confronting relationship a pair of carton end patches having a thermoplastic adhesive on the confronting faces thereof, a carriage adapted to support an open ended carton having outwardly projecting flaps at opposite opened ends thereof, an open ended end patch magazine on said carriage, means for moving said carriage to an initial position within said station wherein said end patch holders are in alignment with the open ends of said end patch magazine, means for reciprocating said end patch holders into the open ends of said magazine and into contact with end patches therein, vacuum means for transferring an end patch from said magazine to each of said end patch holders, means for retracting said end patch holders from said magazine, means for moving said carriage to a limit position within said station to dispose the open ends of a carton thereon in alignment with said end patch holders, end flap positioning fingers associated with each of said end patch holders in said station for engaging and turning inwardly the end flaps of a carton, means operative when said carriage has been moved to said limit position for operating said fingers and for initially advancing said end patch holders toward each other whereby end patches supported thereby are brought into contact with the free edges of the end flaps of a carton on said carriage and an annular recess is thereby formed between the end flaps of a carton on said carriage and the end patches supported by said end patch holders, a hot air jet associated with each of said end patch holders and so located within said station as to discharge hot air into the annular recess formed between the end flaps and the end patches of a carton to be sealed, means effective after the initial advance of said end patch holders for admitting hot air to said jets whereby the end patch adhesive surface defined by said annular recess is heated, means thereafter effective to withdraw said flap-engaging fingers and further advance said patch holders into flush contact with the ends of a carton to effect a carton sealing operation, means for retracting said end patch holders, and means finally effective to move said carriage from said end patch applying station.

6. In a machine for applying end patches to the ends of tubular open end cartons, an end patch applying station, a pair of end patch holders in said station for supporting in spaced confronting relationship a pair of carton end patches having a thermoplastic adhesive on the confronting faces thereof, a carriage adapted to support an open ended carton having outwardly projecting flaps at opposite opened ends thereof, a carriage cam having a lobe for moving said carriage to a limit position within said station to dispose the open ends of a carton thereon in alignment with said end patch holders, end flap positioning fingers associated with each of said end patch holders in said station for engaging and turning inwardly the end flaps of a carton, means operative when said carriage has been moved to said limit position for operating said fingers and for initially advancing said end patch holders toward each other whereby end patches supported thereby are brought into contact with the free edges of the end flaps of a carton on said carriage and an annular recess is thereby formed between the end flaps of a carton on said carriage and the end patches supported by said end patch holders, a hot air jet associated with each of said end patch holders and so located within said station as to discharge hot air into the annular recess formed between the end flaps and the end patches of a carton to be sealed, means effective after the initial advance of said end patch holders for admitting hot air to said jets whereby the end patch adhesive surface defined by said annular recess is heated, means thereafter effective to withdraw said flap-engaging fingers and further advance said patch holders into flush contact with the ends of a carton to effect a carton sealing operation, means for retracting said end patch holders, and a second lobe on said carriage cam effective to move said carriage from said end patch applying station.

7. In a machine for applying end patches to the ends of tubular open end cartons, an end patch applying station, a pair of axially aligned end patch holders mounted in said station for reciprocating motion toward and away from each other adapted to support in spaced confronting relationship a pair of carton end patches, a carriage adapted to support an open ended carton having outwardly projecting flaps at opposite opened ends thereof, an open ended end patch magazine on said carriage, means for moving said carriage to an initial position within said station wherein said end patch holders are in alignment with the open ends of said end patch magazine, means for reciprocating said end patch holders into the open ends of said magazine and into contact with end patches therein, means for transferring an end patch from said magazine to each of said end patch holders, means for retracting said end patch holders from said magazine, means for moving said carriage to a limit position within said station to dispose the open ends of a carton thereon in alignment with said end patch holders, means operative when said carriage has been moved to said limit position for initially advancing said end patch holders toward each other whereby end patches supported thereby are brought into contact with the free edges of the end flaps of a carton on said carriage and an annular recess is thereby formed between the end flaps of a carton on said carriage and the end patches supported by said end patch holders, means associated with each of said end patch holders and so located within said station as to render adhesive the surface of the end patches defining the annular recess formed between the end flaps and the end patches to be sealed thereto, means thereafter effective to further advance said patch holders into flush contact with the ends of a carton to effect a carton sealing operation, means for retracting said end patch holders, means operative during the retraction of said end patch holders for directing a stream of cold air against said end patches, and means finally effective to move said carriage from said end patch applying station.

8. In a carton sealing machine, a sealing head comprising an annular air manifold, a carton closure holder mounted for reciprocation in the space defined by said manifold, a plurality of carton flap positioning fingers mounted on said manifold for rocking movement toward and away from said carton closure holder, means for rotating said positioning fingers toward said holder and into carton flap engaging position, means thereafter operative to reciprocate said closure holder into carton flap engaging position, and means for discharging a stream of air from said manifold at the point of juncture of said fingers and said holder.

9. In a carton sealing machine, a sealing head comprising an annular air manifold, a vacuum head mounted for reciprocation in the space defined by said manifold, a plurality of carton flap positioning fingers mounted on said manifold for rocking movement toward and away from said vacuum head, means for rotating said positioning fingers toward said holder and into carton flap engaging position, means thereafter operative to reciprocate said vacuum head into carton flap engaging position, and means for discharging a stream of air from said manifold at the point of juncture of said fingers and said head.

10. In a carton sealing machine, a sealing head comprising an annular hot air manifold, a carton closure holder mounted for reciprocation in the space defined by said manifold, a plurality of carton flap positioning fingers mounted on said manifold for rocking movement toward and away from said carton closure holder, means for rotating said positioning fingers toward said holder and into carton flap engaging position, means thereafter operative to reciprocate said closure holder into carton flap engaging position, and means for discharging a stream of hot air from said manifold at the point of juncture of said fingers and said holder.

11. In a carton sealing machine, a sealing head comprising an annular hot air manifold, a vacuum head mounted for reciprocation in the space defined by said manifold, a plurality of carton flap positioning fingers mounted on said manifold for rocking movement toward and away from said vacuum head, means for rotating said positioning fingers toward said holder and into carton flap engaging position, means thereafter operative to reciprocate said vacuum head into carton flap engaging position, and means for discharging a stream of hot air from said manifold at the point of juncture of said fingers and said head.

12. In a carton sealing machine, a sealing head comprising an annular air manifold, an electric heating coil in said manifold, a vacuum head mounted for reciprocation in the space defined by said manifold, a plurality of carton flap positioning fingers mounted on said manifold for rocking movement toward and away from said vacuum head, means for simultaneously rotating said positioning fingers toward said holder and into carton flap engaging position, means thereafter operative to reciprocate said vacuum head into carton flap engaging position, and means for discharging a stream of hot air from said manifold at the point of juncture of said fingers and said head.

References Cited in the file of this patent

UNITED STATES PATENTS

| | | |
|---|---|---|
| Re. 21,573 | Schmidt | Sept. 17, 1940 |
| 2,110,815 | Parsons | Mar. 8, 1938 |
| 2,774,204 | Bowman | Dec. 18, 1956 |

UNITED STATES PATENT OFFICE
CERTIFICATE OF CORRECTION

Patent No. 2,912,809                                                    November 17, 1959

Paul F. Bowman

It is hereby certified that error appears in the printed specification of the above numbered patent requiring correction and that the said Letters Patent should read as corrected below.

Column 3, line 53, for "platen" read -- platens --; line 59, for "carriage 18 is in alignment with the platens 28 and 30" read -- reception of the end patches. The platens 28 and 30 --; column 8, line 68, for "containing" read -- contacting --.

Signed and sealed this 17th day of May 1960.

(SEAL)
Attest:

KARL H. AXLINE                                                    ROBERT C. WATSON
Attesting Officer                                             Commissioner of Patents